United States Patent [19]
Wright

[11] 4,077,617
[45] Mar. 7, 1978

[54] VEHICLE LEVELING VALVE DEVICE WITH DAMPENING ARRANGEMENT

[75] Inventor: Raymond C. Wright, Irwin, Pa.

[73] Assignee: Westinghouse Air Brake Company, Wilmerding, Pa.

[21] Appl. No.: 692,597

[22] Filed: Jun. 3, 1976

[51] Int. Cl.$^2$ .............................................. F16F 5/00
[52] U.S. Cl. ................................... 267/65 D; 280/714
[58] Field of Search ............ 267/65 D; 280/703, 708, 280/713, 714; 105/197 B; 137/627.5

[56] References Cited
U.S. PATENT DOCUMENTS

| | | | |
|---|---|---|---|
| 3,143,361 | 8/1964 | Herbenar et al. | 280/714 |
| 3,183,935 | 5/1965 | Davies et al. | 280/714 |

*Primary Examiner*—James B. Marbert
*Attorney, Agent, or Firm*—R. S. Visk; R. W. McIntire, Jr.

[57] ABSTRACT

A vehicle leveling valve device for adjusting air spring pressure according to vehicle load and including a hydraulic dampening arrangement wherein one or the other of an air pressure supply or an exhaust valve connected to the air springs is actuated, according to the change in vehicle load, by one of a pair of respective leaf springs when deflected by a cam, in turn, operable responsively to variation in vehicle load and height. Deflection of each leaf spring is resisted by respective hydraulic pistons which are arranged to yield to a normal rate of vehicle load change and therefore permit operation of either the supply or exhaust, but resist any momentary change of vehicle height, such as caused by a jounce, and therefore restrain deflection of the leaf springs and preclude any untimely operation of the valve device.

8 Claims, 6 Drawing Figures

VEHICLE LEVELING VALVE DEVICE WITH DAMPENING ARRANGEMENT

BACKGROUND OF THE INVENTION

One objection raised in connection with some of the presently known leveling valve devices, especially those used on railway passenger vehicles, is that untimely operation of the leveling valve device, and therefore undesirable adjustment of vehicle height, may be caused by excessive jouncing of the vehicle, resulting in momentary variations of the relative height between the sprung and unsprung portions of the vehicle. Such momentary variations of the relative height, though not reflecting an actual change in vehicle load, may result in operation of the leveling valve device and consequent unnecessary and undesirable adjustment of air spring pressure, which adjustment could result in an uncomfortable ride for the vehicle occupants.

SUMMARY OF THE INVENTION

The object of the present invention, therefore, is to provide a vehicle leveling valve device for use with vehicle air springs and having the capability of precluding normal operation of the leveling valve device for effecting an adjustment in air spring pressure in response to false indications of vehicle load changes that may be caused by jouncing of the vehicle.

Briefly, the invention comprises a leveling valve device including the usual supply and exhaust valves for increasing or decreasing air pressure in the air spring directly proportional to any change in vehicle load and, therefore, in the relative height between sprung and unsprung portions of the vehicle for maintaining the sprung portion at a reasonably desirable level compatible with passenger comfort. Either the supply or exhaust valve is operable by deflection of one or the other of respective leaf springs, depending upon whether the vehicle load is increased or decreased, to either supply air pressure to or exhaust air pressure from the air springs, provided the increase or decrease of relative height between the sprung and unsprung portions of the vehicle occurs at a normal rate such as when taking on or discharging passengers. In order to prevent untimely or unnecessary adjustment of air spring pressure in response to momentary or false change in the relative height, as caused by jouncing of the vehicle over a rough road bed, respective hydraulic pistons are arranged with each leaf spring to limit deflection thereof in response to jouncing, but to yield to normal rate of vehicle level change and, therefore, allow sufficient deflection of the leaf springs for effecting consequent operation of the appropriate valve.

DESCRIPTION AND OPERATION

Figure 1:
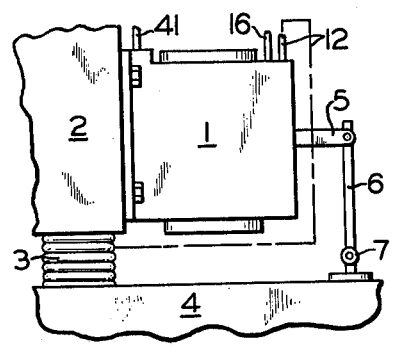
FIG. 1 is a diagrammatic elevational view, in outline, of a typical installation on a vehicle of a leveling valve device embodying the invention.

As shown diagrammatically in FIG. 1 of the drawings, a leveling valve device 1 embodying the invention is secured to a sprung portion 2 of a vehicle (not shown) which may be, for example, the passenger carrying compartment of a railway vehicle. Sprung portion 2 is supported on an air spring 3 interposed between said sprung portion and an unsprung portion 4 such as the frame of a vehicle wheel truck. A horizontally disposed operating arm 5 of the leveling valve device 1 has a pivotally fixed end thereof operably connected to said valve device, and a free end pivotally connected to one end of a vertically disposed connecting rod 6, the other end of said connecting rod being pivotally connected at 7 to the unsprung portion 4. When sprung portion 2, and therefore valve device 1, are vertically displaced either upwardly or downwardly relative to unsprung portion 4, as when a change in vehicle load occurs, connecting rod 6 causes operating arm 5 to be rotated accordingly about its fixed end for effecting corresponding actuation of the leveling valve device, as will be more fully explained hereinafter.

Leveling valve device 1 comprises a casing 8 having operably disposed therein a supply valve member 9 and an exhaust valve member 10, both of which may be reciprocably operable spool type valves, for example. Casing 8 has formed therein a delivery passageway 11 connected via a pipe 12 to vehicle air spring 3 (see FIG. 1) and via a branch passageway 13 to supply valve member 9. A supply passageway 15 also formed in casing 8 is connected via a pipe 16 to a source of air pressure, such as a main reservoir (not shown) and is also connected to supply valve member 9 such that in a normal or cut-off position of said supply valve member (in which it is shown) communication between passageways 13 and 15 is cut off. Supply valve member 9 is urged toward its cut-off position by a spring 17 acting thereon. When supply valve member 9 is operated to a supply position (in a manner to be hereinafter disclosed), passageway 15 is communicated with passageway 13 for supplying air pressure to the air spring 3.

Exhaust valve member 10 is urged by a spring 18 toward a normal or closed position in which it is shown and in which communication between passageway 11 and an exhaust passageway 19 formed in casing 8 and leading to atmosphere is closed. When exhaust valve member 10 is operated to an exhaust position (in a manner to be hereinafter disclosed), passageway 11 is communicated with passageway 19 to thereby allow air spring pressure to be released to atmosphere.

According to the invention, in order to prevent untimely operation of supply valve member 9 and exhaust valve member 10, which are axially aligned with each other in casing 8 and in operably opposing relationship, a pair of leaf springs 20 and 21, arranged in parallel spaced-apart relation, is perpendicularly interposed between said valve members, the inherent resiliency of said leaf springs acting to bias the free ends thereof into contact with operating stems 22 and 23 of said valve members, respectively. The other ends of leaf springs 20 and 21 remote from the free ends thereof are connected to each other in parallel spaced-apart relation through an anchor member 24 secured in casing 8.

The end of operating arm 5 opposite the end connected to connecting rod 6 is rotatably mounted in casing 8 by a pin 25 which also has secured thereto for rotation therewith a cam member 26, the location of said pin in said casing being such that said cam member is operably sandwiched between leaf springs 20 and 21 adjacent the ends secured in anchor member 24.

Figure 3:
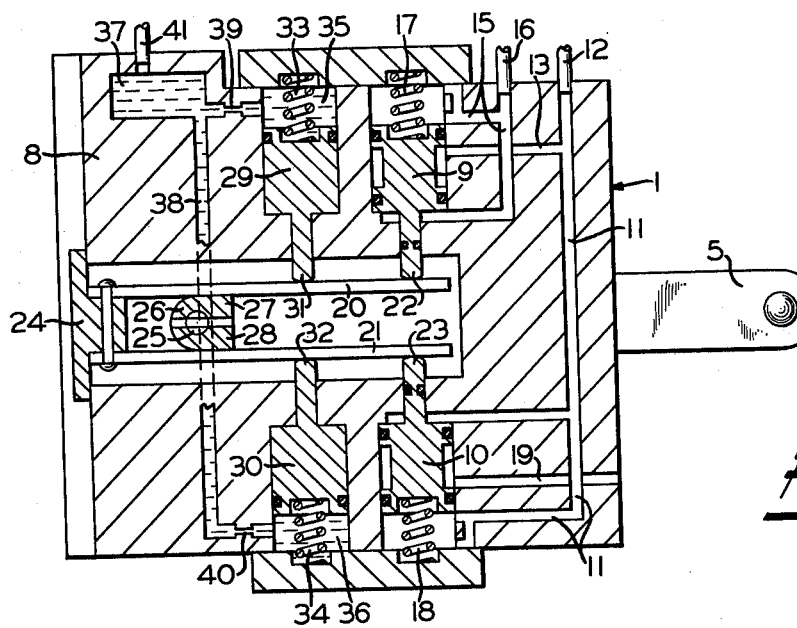
FIG. 3 is an elevational view in section and on the same scale as FIG. 2, of the valve device shown in FIG. 2 taken along line III—III, as viewed in the direction indicated by the arrows.

The contour of cam member 26 includes a 180° sector of uniform radius and two high points or apogees 27 and 28 formed and equi-angularly spaced on the periphery of the remaining 180° sector. Thus when operating arm 5, and consequently cam member 26, occupy respective normal or neutral positions, in which they are shown in FIG. 3, leaf springs 20 and 21 are in normal relaxed states in which supply valve 9 and exhaust valve 10 occupy their cut-off and closed positions, respectively. Rotation of arm 5 in a counterclockwise direction, as viewed in FIG. 3, due to increased vehicle load, causes corresponding rotation of cam member 26 and deflection of leaf spring 20 by high point 27 of said cam member, while leaf spring 21 remains in its normal relaxed position. Rotation of arm 5 in a clockwise direction due to decreased vehicle load causes corresponding rotation of cam member 5 and consequent deflection of leaf spring 21 by high point 28, while leaf spring 20 remains in its normal relaxed position.

Thus, under normal or actual change of vehicle load, that is, either an increase or a decrease thereof, one or the other of supply valve 9 or exhaust valve 10 is operated by deflection of the respective leaf spring 20 or 21 to the supply or exhaust position, depending upon occurrence of a vehicle load increase or decrease, respectively. In effecting operation of either one of the valve members 9 or 10, deflection of the respective leaf spring 20 or 21 must be such as to have the free ends thereof displaced sufficiently for effecting said operation of one or the other of the valve members, or what may be called a full-length deflection of the leaf spring affected.

Also in accordance with the invention, two oppositely acting, axially aligned hydraulic pistons 29 and 30 are operably arranged so that respective piston stems 31 and 32 formed on said pistons are urged by respective springs 33 and 34, acting through the pistons, into contact with leaf springs 20 and 21, respectively, on the same sides contacted by valve stems 22 and 23. Piston stems 31 and 32 make contact with leaf springs 20 and 21, respectively, at points located axially between cam member 26 and the points of contact of valve stems 22 and 23, respectively.

Pistons 29 and 30 cooperate with casing 8 to form respective hydraulic fluid or piston chambers 35 and 36 adjacent the sides of said pistons opposite the stems 31 and 32, respectively. Hydraulic fluid chambers 35 and 36 are connected to a hydraulic fluid reservoir 37 via a connecting passageway 38, both of which are formed in casing 8, and respective chokes 39 and 40 interposed between said passageway and said chambers in parallel relation to each other. Hydraulic fluid, such as oil, for example, in reservoir 37 is kept supplied via a pipe 41.

Figure 2:
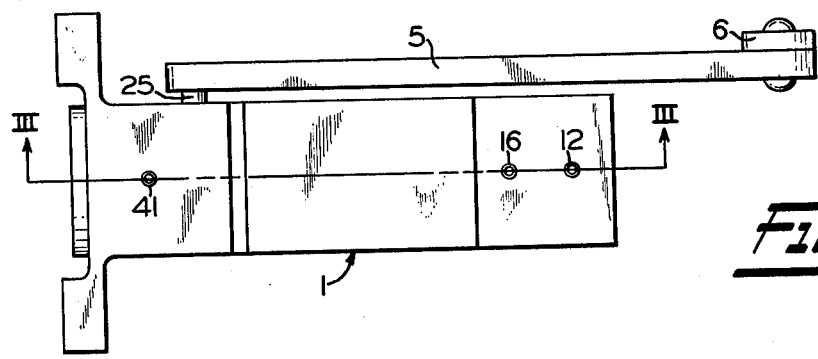
FIG. 2 is a plan view, in outline, of the valve device shown in FIG. 1, but on a larger scale thereof.

In considering the operation of the leveling valve device shown in FIGS. 2 and 3 particularly, it may be assumed that the vehicle load is increased by boarding passengers, thereby causing downward movement of sprung portion 2 relative to unsprung portion 4. As a result, operating arm 5 is relatively rotated in a counterclockwise direction out of its neutral position to a first operating position in which corresponding rotation of cam member 26 is effected and, therefore, upward deflection of leaf spring 20, as above described, by high point 27. Since the uniform radius sector of cam member 26 remains in contact with leaf spring 21, said leaf spring is unaffected by rotation of the cam at this time and remains in its neutral position.

Since the load change or the resulting change in relative height between the sprung and unsprung portions 2 and 4, as immediately above described occur at what may be called a normal or a certain rate consistent with taking on passengers (or unloading also, if such be the case), hydraulic piston 29 yields to upward movement of leaf spring 20, because the dimensions of chokes 39 and 40, which are both the same, are preselected for accommodating flow of hydraulic fluid therethrough at a rate consistent with the normal rate of change of vehicle load, as above described. When piston 29 yields to force applied thereto by deflection of leaf spring 20, the free end of said leaf spring, as viewed in FIG. 3, is also deflected upwardly, that is, full-length deflection, above defined, of the leaf spring occurs, for effecting corresponding upward movement of valve member 9 to its supply position, above defined, in which passageway 15 is communicated with passageway 13 to thereby effect supply of additional air pressure to air spring 3. When, due to the increased pressure in air spring 3, the vehicle height, or the relative height between sprung portion 2 and unsprung portion 4, has been restored to the normal height, operating arm 5, cam member 26, and leaf spring 20 all resume their respective normal or neutral positions in which springs 17 and 33 are rendered effective for restoring valve member 9 and piston 29 to their respective normal positions to terminate further supply of air pressure to the air spring.

It should be apparent that in a situation in which the vehicle load is lightened by discharge of passengers, operating arm 5 is rotated in a clockwise direction to a second operating position for effecting operation of cam member 26, leaf spring 21, and piston 30 to their respective neutral positions, and, consequently, valve member 10 to its exhaust position in a manner similar to that described above in connection with an increase in vehicle load, but in this instance for reducing air pressure in air spring 3 via exhaust passageway 19 until normal relative height is restored between sprung portion 2 and unsprung portion 4.

In order to prevent hang-up of either of the valve members 9 or 10 during operation, pressure on both sides of said valve members is equalized by connecting supply passageway 15, via branch connections, to opposite sides of valve member 9, and by connecting delivery passageway 11, via branch connections, to opposite sides of exhaust valve member 10.

Of course, when the oil in either of piston chambers 35 or 36 is displaced due to displacement of either of the pistons 29 or 30, the oil thus displaced is replenished from reservoir 37, passageway 38, and choke 39 or 40, respectively.

If a jouncing action of the sprung portion 2 of the vehicle occurs, perhaps due to a rough road bed, rotational displacement of operating arm 5 also results from such jouncing action. But in that the displacement of said operating arm, in this case, is momentary and erratic and not a result of an actual change in vehicle load nor at a rate comparable to that described above in connection with normal load changes, the leveling valve device 1 does not operably respond for effecting a change in air spring pressure or a relative height adjustment. The resulting momentary rotation of cam member 26 is not effective for maintaining a sustained force on either of leaf springs 20 or 21, and due to the preselected flow rate of chokes 39 and 40, the momentary force of either leaf spring on one or the other of pistons 29 and 30 is insufficient for operating said pistons against the restricted flow of the chokes. Thus, the effects of the jouncing action and resulting momentary rotations of cam member 26, are dissipated and absorbed byt slight flexing of those axial portions of leaf springs 20 and 21 between anchor member 24 and the points of contact with piston stems 31 and 32, or what may be called partial deflection of the leaf spring.

It is thus seen, that the leveling valve device 1 embodying the invention and above described, allows adjustment of vehicle height only in response to an actual change in vehicle load occurring at a normal predetermined rate, and not in response to false indications of vehicle load changes as may be caused by jouncing of the vehicle.

Figure 4:
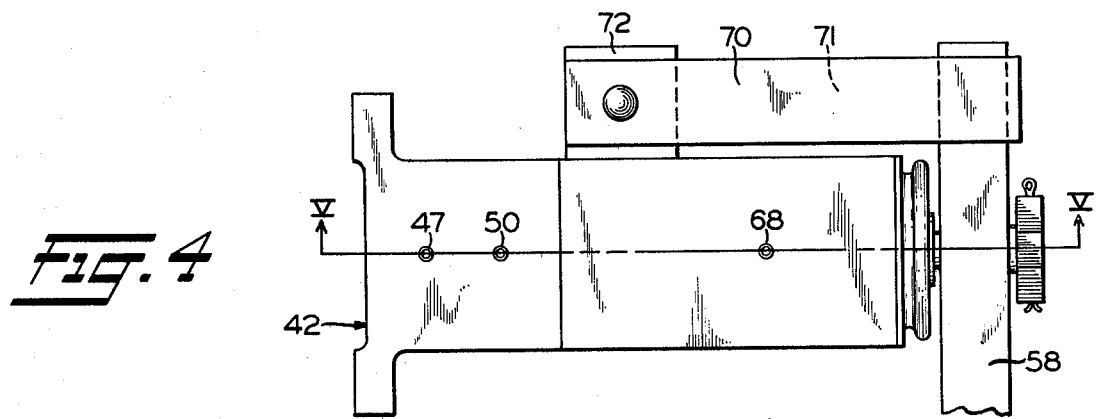
FIG. 4 is a plan view, in outline and on the same scale as FIGS. 2 and 3, of a modified version of the valve device shown in FIG. 2.
Figure 5:
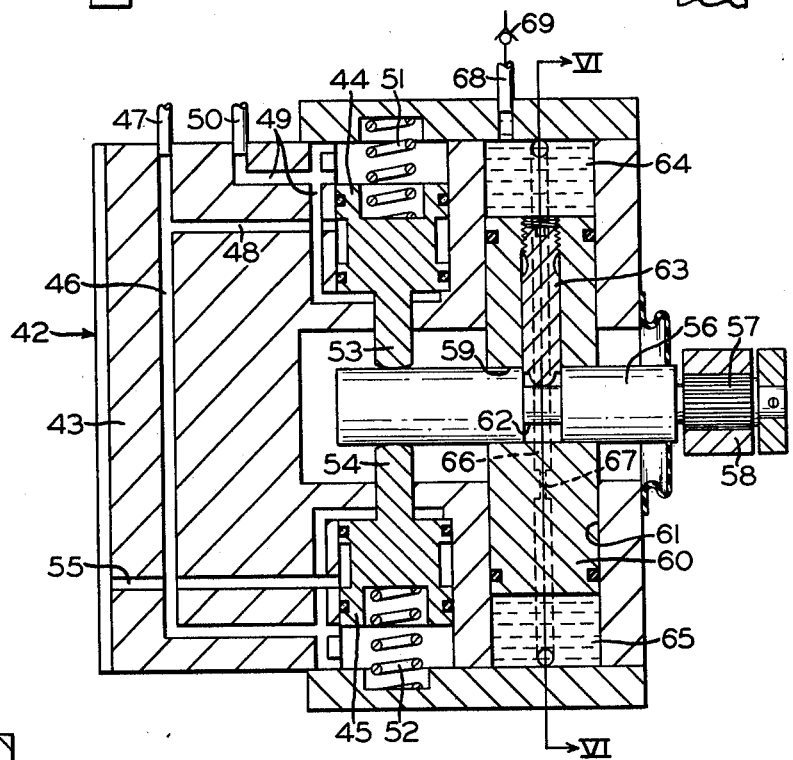
FIG. 5 is an elevational view, in section and on the same scale as FIGS. 2, 3, and 4, of the valve device shown in FIG. 4 taken along line V—V, as viewed in the direction indicated by the arrows.
Figure 6:
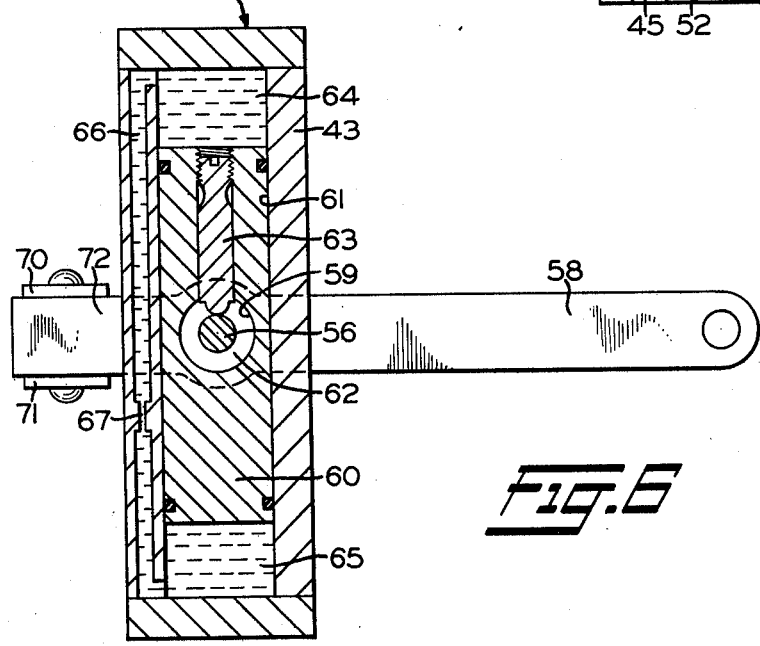
FIG. 6 is a sectional view taken along line VI—VI of FIG. 5, on the same scale as FIGS. 2, 3, 4 and 5, and as viewed in the direction indicated by the arrows.

A modified leveling valve device 42 is shown in FIGS. 4, 5, and 6, and is mounted on the vehicle in similar manner as the leveling valve device 1. Leveling valve device 42 comprises a casing 43 having operably disposed therein a supply valve member 44 and an exhaust valve member 45, a delivery passageway 46 connected to the vehicle air spring 3 via a pipe 47 and to the opposite sides of said exhaust valve member, a branch passageway 48 connecting said delivery passageway to said supply valve member, a supply passageway 49 connected via a pipe 50 to the main reservoir (not shown) and connected to the opposite sides of said supply valve member, springs 51 and 52 acting on said supply and exhaust valve members, respectively, valve stems 53 and 54 formed on said supply and exhaust valve members, respectively, and an exhaust passageway 55 connecting said exhaust valve member to atmosphere. The several valve members, passageways, springs and valve stems shown in FIG. 5 are arranged similarly to the corresponding parts of leveling valve device 1, as shown in FIG. 3, and, therefore, it is not deemed essential to further describe such arrangement.

A torque member or shaft 56 is horizontally disposed in casing 43 axially perpendicularly to valve stems 53 and 54 of valve members 44 and 45, said valve stems being urged into contact with the inner axial portion of said torque member by springs 51 and 52 acting on said valve members, respectively. Torque member 56 is provided with a splined end 57 projecting exteriorly of casing 43. An operating arm 58 (corresponding to operating arm 5 of valve device 1) is secured, at an inner point between its ends, to the splined end 57 of and in perpendicular relation to torque member 56.

Torque member 56 passes coaxially through a bore 59 formed in a hydraulic piston 60 perpendicularly to the axis of said piston which is reciprocably operable in a bore 61 formed in casing 43 parallel to the axes of supply and exhaust valve members 44 and 45, said valve members being axially aligned in opposing relation to each other. Bore 61 is located in casing 43 such that bore 59 of piston 60 axially intersects torque member 56 substantially intermediate the ends thereof. An annular groove 62 is formed on torque member 56 in intersecting relation with the axis of piston 60 for receiving the inner end of a set screw 63 secured coaxially in one end of said piston for securing said torque member in an operative position relative to said piston and to valve members 44 and 45.

The opposite ends of piston 60, which normally occupies a central axial position in bore 61, cooperate with casing 43 to form respective hydraulic fluid or piston chambers 64 and 65 adjacent said opposite ends, said chambers being communicated with each other via a connecting passageway 66 in which a choke 67 is interposed. Hydraulic fluid or oil is supplied to chambers 64 and 65 via a pipe 68 connecting into the upper chamber 64, as viewed in FIG. 5. A one-way check valve 69 is interposed in pipe 68 so as to form, in effect, with the two chambers 64 and 65, a closed hydraulic system between the opposite ends of piston 60.

Operating arm 58, similarly to operating arm 5 of leveling valve device 1, normally occupies a neutral horizontal position in which it is shown in FIGS. 5 and 6 and in which torque member 56 correspondingly occupies a neutral position in which supply valve member 44 is in a cut-off position, exhaust valve member 45 is in a closed position, and piston 60 is in its central position, said valve positions being similar to those described in connection with valve members 9 and 10. Since the operation and functions of valve members 44 and 45, when actuated by shaft 56 (in a manner to be hereinafter disclosed), are similar to those of valve members 9 and 10, no further detailed description of such operation and functions is deemed necessary, other than to say that air spring 3 is either supplied with additional air pressure or relieved thereof, depending on which of said valve members is actuated.

If leveling valve device 42 were substituted for leveling valve device 1, the free end of operating arm 58, similarly to arm 5, is pivotally connected to the end of connecting rod 6. The opposite end of operating arm 58 is disposed between the free ends of a pair of parallel spaced-apart leaf springs 70 and 71, which, in this case, are disposed exteriorly of casing 43 and have corresponding ends connected in such parallel spaced-apart relation by an anchor member 72 which is secured to one side of said casing, as shown in FIG. 4. Leaf springs 70 and 71 are disposed parallel to torque member 56 with the free ends thereof exerting a yieldable clamping force on the end of operating arm 58 separably disposed therebetween, such clamping action thus serving to bias said operating arm toward its neutral position, above defined.

In operation of leveling valve device 42, when a change of vehicle load occurs at a normal rate, as above described, operating arm 58 is rotated by rod 6 either in a clockwise (for load decrease) or a counterclockwise (for load increase) direction about the end clamped between the ends of leaf springs 70 and 71. If it is assumed that arm 58 is rotated in a counterclockwise direction, as viewed in FIG. 6, such movement of said arm is translated into upward longitudinal displacement of torque member 56 parallel to its axis, which, in turn, causes upward axial movement of piston 60 also. Upward movement of piston 60 results because, under the conditions set forth, fluid from chamber 64 may flow to chamber 65 via passageway 66, notwithstanding the presence of choke 67 in said passageway. This is so, because, as in the case of chokes 39 and 40 of valve device 1, the flow rate of choke 67 is also compatible with the normal rate of rotation of arm 58 caused by actual change of vehicle load under normal conditions.

With piston 60 yielding to upward longitudinal movement of torque member 56, such upward movement of said torque member also causing operation of valve member 44 to its supply position. When air spring pressure has increased to a degree sufficient for restoring spring portion 2 to the desired relative level, arm 58, torque member 56, piston 60 and valve member 44 gradually resume their respective normal or neutral positions.

Of course, if arm 58 is rotated in a clockwise direction in response to a normal decrease of vehicle load, said arm, torque member 56, and piston 60 all move oppositely to the manner above described in connection with an increase in vehicle load, to cause actuation of exhaust valve 45 and, therefore, release of air spring pressure and corresponding adjustment of the vehicle level.

Should jouncing of spring portion 2 occur, such jouncing would cause corresponding rotation of arm 58, but since such rotation of the arm is momentary and erratic in nature, that is, not occurring at a normal rate, choke 67 inhibits ready transfer of fluid from one of chambers 64 and 65 to the other, and therefore piston 60 is retained in its normal central position. With piston 60 retained in its central position, torque member 56 is retained in its neutral position and, therefore, neither of the valve members 44 and 45 is operationally affected. Moreover, since torque member 56 is retained in its neutral position, the splined end 57 acts as the pivotal point for rotative motion of arm 58, with the resultant motion of the end of said arm disposed between leaf springs 70 and 71 and being accommodated and dissipated by the resiliency provided by said leaf springs.

Having now described the invention, what I claim as new and desire to secure by Letters Patent, is:

1. A leveling valve device interposable between a sprung portion and an unsprung portion of a vehicle and operable responsively to relative movement therebetween resulting from variation in vehicle load for accordingly effecting increase or decrease of air pressure in an air spring for maintaining a normal relative height between the sprung and unsprung portions, said leveling valve device comprising:
   (a) a casing;
   (b) valve means disposed in said casing and operable to a supply position, in which air pressure is supplied to the air spring, and to an exhaust position in which air pressure is released from the air spring;
   (c) operating means connected to said valve means and movable in one direction, by relative movement between the sprung and unsprung portions in said one direction at a certain rate, to a first operating position for effecting operation of said valve means to said supply position, and movable in an opposite direction relative to said one direction, by relative movement between the sprung and unsprung portions of the vehicle in said opposite direction at said certain rate, to a second operating position for effecting operation of said valve means to said exhaust position; and
   (d) dampening means operably interposed between said valve means and said operating means and being yieldable to movement of said operating means in either said one or said opposite directions, when said movement occurs at said certain rate or less, for transmitting such movement to and effecting operation of said valve means accordingly, and for dampening said movement of said operating means occurring at a rate in excess of said certain rate for inhibiting transmission thereof to said valve means.

2. A leveling valve device, as set forth in claim 1, wherein said valve means comprises a supply valve member arranged in operably opposed relation to an exhaust valve member for alternative operation thereof from respective cut-off and closed positions, in which air pressure supply and exhaust communications to and from the air spring are closed, to said supply or exhaust position, in which one or the other of said communications is open depending upon the direction of movement of said operating means in said one or said opposite direction, respectively.

3. A leveling valve device, as set forth in claim 2, wherein said dampening means comprises hydraulic piston means subjected to hydraulic fluid in opposing relation to said movement of the operating means, said hydraulic piston means including choke means of predetermined flow capacity via which hydraulic fluid acting on the piston means may be released at a rate compatible with said certain rate, or less, of the movement of the operating means for rendering the piston means yieldable thereto.

4. A leveling valve device, as set forth in claim 3, wherein said operating means comprises:
   (a) a pair of parallel spaced-apart leaf springs having corresponding fixed ends anchored in said casing and corresponding opposite free ends operably engaging said supply and exhaust valve means, respectively, said leaf springs being yieldingly engaged by said piston means and normally restrained thereby in respective normal relaxed positions, in which said supply and exhaust valve members occupy their respective cut-off and closed positions;
   (b) a cam member rotatably sandwiched between said leaf springs adjacent the fixed ends thereof and having a normal position in which said leaf springs occupy their respective relaxed positions, and being operable, when rotated in one direction at a rate corresponding to said certain rate or less, for causing deflection of one of said leaf springs out of its relaxed position and effecting operation of said supply valve member to said supply position, and when rotated in an opposite direction at a rate corresponding to said certain rate or less for causing restoration of said one leaf spring to its relaxed position and deflection of the other leaf spring out of its relaxed position for effecting operation of said exhaust valve member to its said exhaust position; and
   (c) an operating arm having one end rotatably supported on said casing with said cam member carried on said one end of said arm for rotation therewith, the other end of said arm being operably connected between the sprung and unsprung portions of the vehicle for effecting rotative movement of said arm and said cam member in said one or said opposite direction according to the direction of said relative movement between the sprung and unsprung portions.

5. A leveling valve device, as set forth in claim 4, wherein said dampening means comprises a pair of pistons opposingly disposed on opposite sides of said pair of leaf springs for making abutting contact therewith between the fixed ends and the free ends, said pistons being subjected to hydraulic fluid in respective hydraulic chambers formed adjacent respective ends thereof and in opposing relation to deflection of said leaf springs, respectively, and respective choke means of predetermined flow capacity via which hydraulic fluid may flow from said hydraulic chambers at a rate compatible with said certain rate, or less, of movement of the operating means for rendering said pistons yieldable to deflection of said leaf springs, respectively.

6. A leveling valve device, as set forth in claim 3, wherein said operating means comprises:
   (a) a pair of parallel spaced-apart leaf springs having corresponding fixed ends anchored to said casing;
   (b) a torque member disposed longitudinally between and axially perpendicularly to said supply and exhaust valve members for operably engaging said valve members and said piston means;
   (c) an operating arm secured at an inner point between its two ends to one end of said torque member in perpendicular relation thereto,
   (d) said operating arm having one end yieldingly restrained between corresponding free ends of said leaf springs opposite said fixed ends in perpendicular relation to the leaf springs, the other end of said arm being operably connected between the sprung and unsprung portions of the vehicle for effecting rotative movement of said arm, in one direction or the other, responsively and according to the relative movement between the sprung and unsprung portions,
   (e) said rotative movement of said arm occurring about said one end thereof, when said relative movement between the sprung and unsprung portion occurs at said certain rate or less, for causing longitudinal displacement of said torque member and consequent displacement of the piston means and operation of one or the other of said valve members to a corresponding supply or exhaust position, and
   (f) said rotative movement of said arm occurring about said inner point thereof when said relative movement between the sprung and unsprung portions of the vehicle occurs at a rate in excess of said certain rate, said last-mentioned rotative movement being dampened by said leaf springs.

7. A leveling valve device, as set forth in claim 6, wherein said piston means comprises a single piston reciprocably operable in said casing and having a bore formed therein transversely to the axis and midway between the ends of the piston, and in which bore said torque member is disposed, the opposite ends of said piston being subject to hydraulic fluid in respective chambers formed adjacent said opposite ends for yieldingly resisting said longitudinal displacement of said torque member, said chambers being communicated via a passageway in which said choke means is interposed and via which transfer of said hydraulic fluid between the two chambers is accommodated, upon movement of said piston when yielding to the longitudinal displacement of said torque member.

8. A leveling valve device, as set forth in claim 7, including means for positionally securing said torque member in said bore such that said piston makes operable engagement with said torque member substantially intermediate said one end to which said operating arm is secured and an opposite end operably engaging said valve members.

* * * * *